Nov. 27, 1945.    J. J. WISLER    2,389,946
FLUID COOLED OFFSET TIP ELECTRODE
Filed April 1, 1944
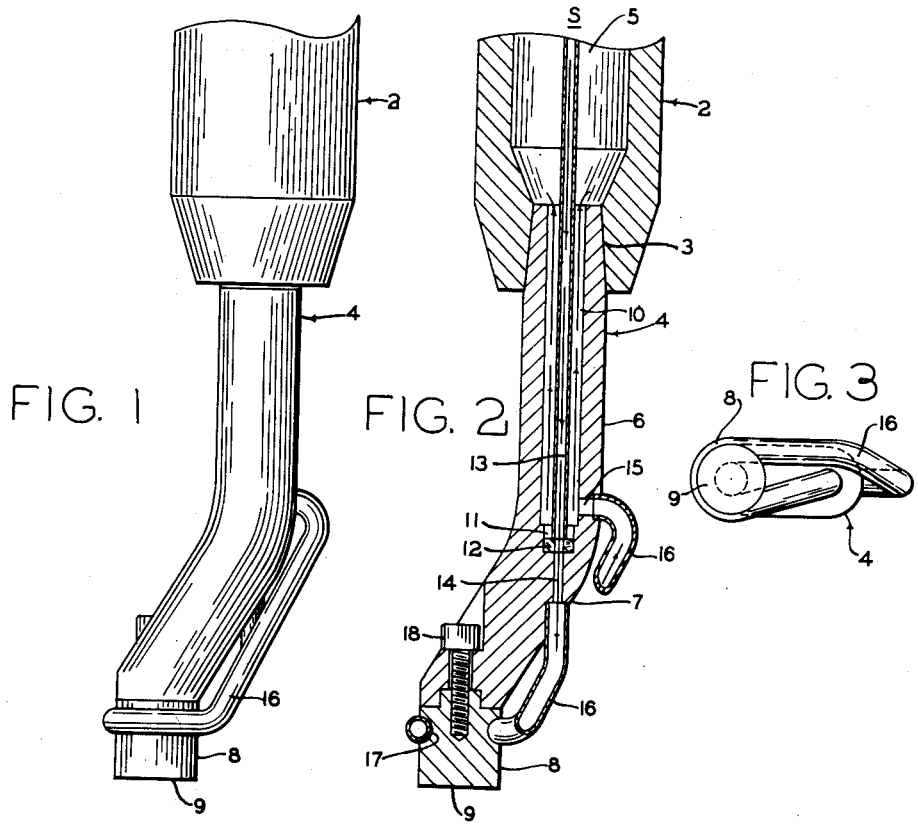
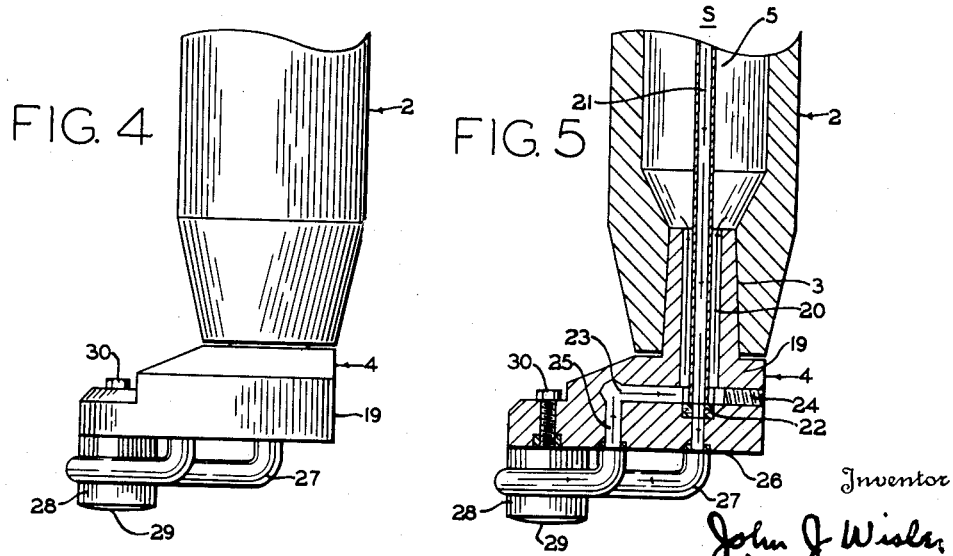
Inventor
John J. Wisler
by
Walter & Kaufman
Attorney Patented Nov. 27, 1945

2,389,946

UNITED STATES PATENT OFFICE 2,389,946

FLUID-COOLED OFFSET TIP ELECTRODE

John J. Wisler, Columbia, Pa., assignor to Armstrong Cork Company, Lancaster, Pa., a corporation of Pennsylvania Application April 1, 1944, Serial No. 529,068

7 Claims. (Cl. 219—4)

This invention relates to resistance type spot welding machines and to an offset tip electrode for such spot welding machines which is provided with means for dissipating heat from the working surface of the tip.

In the spot welding of aluminum alloys, it is highly desirable that the following factors be considered, with regard to the cooling of the welding electrode tips. First, a condition of thermal equilibrium should be established as rapidly as possible, and second, the temperature of the body (and face) of the electrode tip should remain at an optimum low value, generally less than 10° C. If these factors are not taken into consideration and the conditions satisfied, the consistency of weld shape and shear strength will be poor due to failure to establish thermal equilibrium rapidly, and frequent cleaning of the electrode faces will be necessary because of undesirable heating.

It is an object of my invention to provide an offset tip electrode with efficient and adequate heat absorbing means to satisfy the two conditions of (a) rapid establishment of thermal equilibrium and (b) maintenance of a low temperature at the working surface of the tip.

Another object is to provide a cooling arrangement in offset tip electrodes which will permit positive pressure circulation of cooling fluid without weakening the structure to any degree where undue deflection of the electrode will occur.

A further object of my invention is to provide an offset tip welding electrode provided with an arrangement for positively circulating cooling fluid in the immediate vicinity of the working face of the electrode to absorb heat therefrom and maintain a low temperature at such surface and rapidly establish thermal equilibrium.

In order that the invention may be readily understood, I will describe the same in conjunction with the attached drawing, in which:

Figure 1 is a side elevation of an offset tip electrode embodying my invention;

Figure 2 is a longitudinal section of the electrode of Figure 1;

Figure 3 is a bottom plan view of the electrode of Figure 1;

Figure 4 is a side elevation of a modified type of offset tip electrode embodying my invention; and Figure 5 is a view partially in longitudinal section and partially in side elevation of the modified electrode of Figure 4.

The invention is useful with all types of resistance spot welders, and particularly those used for spot welding aluminum alloys and which are provided with means for supplying cooling fluid to the electrode holder for circulation through the electrode. In such machines, the use of offset tip electrodes is often necessary where welding is to be effected in areas where a straight tip cannot be inserted. The use of an offset tip with such spot welders has always had the disadvantages which result from a lack of proper means for conducting heat away from the tip, such as non-uniform welds and excessive downtime for tip cleaning due to undesirable overheating of the working surface of the tip.

With straight shank electrodes, it is possible to bore out the electrode to a point close to the working or welding face and supply water to the bore to absorb heat. With offset tips, this is not possible for machining would be difficult and the structure would be weakened to too great an extent. The offset portion is generally small so as to fit into difficult working areas and as a consequence is not too rigid. The forces encountered in welding may be relatively high and even slight deflection is objectionable since it affects the character of the weld. It is important, therefore, to avoid any weakening of the offset portion which might result in more than slight deformation under welding pressures or forces. In welding aluminum alloys, such as 24 ST Alclad in a thickness of .040", a welding force of 720 pounds may be developed between the electrodes and a forging force of 1540 pounds may be used in completion of the weld. It is not practicable, therefore, to provide an internal cooling system for offset tips for it would weaken the structure to such extent that excessive deformation of the tip would result.

Referring to the attached drawing which illustrates a preferred embodiment of my invention and a modification thereof, the electrode holder has been indicated by the numeral 2. This may be of any of the usual forms or shapes commonly employed in resistance type spot welding machines. In the embodiments illustrated, the electrode holder is provided with a tapered throat 3 which receives the electrode 4. The electrode holder 2 is bored out at 5 for the passage of cooling fluid.

The offset tip electrode 4 of Figures 1, 2, and 3 comprises a body 6 which is offset at 7, and a welding tip or button 8, provided with a working face 9 which engages the metal to be welded. The offset 7 in this embodiment is disposed at an angle of about 65° to the vertical axis of the holder, but this may be varied depending upon the requirements of the work to be welded.

The shank 7 is bored as indicated at 10 and its lower end is counterbored at 11 and receives a washer 12 which may be made of natural cork or other resilient material. A tube 13 is received within the bore 10 and counterbore 11 and lies in engagement with the washer 12. This tube is connected to a source of cooling fluid S. The offset 7 is drilled to provide a passageway 14 communicating with the tube 13. The shank 6 is drilled to provide a passageway 15 communicating with the bore 10 above the seal 12. Each of the passageways 14 and 15 is counterbored to receive and hold a conduit 16 which is preferably formed of copper, although other metals capable of being readily formed and having good heat conducting characteristics may be used.

The tip is turned with a groove 17 spaced as closely adjacent the face 9 as working conditions will permit. The groove 17 receives the conduit 16 which encircles a substantial portion of the tip as shown in Figure 3. One end of the conduit 16 is received in the counterbore of passageway 14 and the other end in the counterbore of passageway 15. In assembly, the surface of the groove 17 is tinned with soft solder and the outer surface of that portion of the conduit 16 which is received within the groove 17 is likewise tinned. The parts are assembled and sufficient heat is applied to join the conduit with the tip in good heat conducting relationship. The conduit is joined to the electrode body in the counterbores of passageways 14 and 15 in a similar fashion by soft solder. Care must be exercised in the joining operations so as not to deleteriously heat the tip or the electrode body for this may have a serious effect on the welding characteristics of the electrode.

With the arrangement shown in Figures 1, 2, and 3, cooling fluid, such as water, is fed from source S, through tube 13, passageway 14, and conduit 16. The cooling fluid is prevented from directly entering the bore 10 by the seal 12. The cooling fluid absorbs heat from the tip 10 and is conveyed by conduit 16 to passageway 15 and then into bore 10 from which it is discharged. This is preferably accomplished by continuous circulation. The fluid follows the direction shown in the arrows, but obviously may follow a reverse path by which the fluid may be charged into bore 10 and discharged through tube 13. It may be discharged directly from the tube 16 without return through the bore 10, if desired, but since most welding machines are provided with a cooling system for straight shank electrodes, it is preferable to interconnect the cooling system from the offset tip into the supply and discharge arrangement provided in the electrode holder.

The tip 8 is secured to the electrode body 6 by a hollow head set screw 18.

In the electrode shown in Figures 4 and 5, the electrode body 19 is offset at an angle of about 90° with respect to the vertical axis of the electrode holder to provide for engagement of work pieces in confined areas. The electrode 19 is provided with a central bore 20 which receives a tube 21, sealed by a washer 22. A passageway 23 is provided which connects with the bore 20. This is provided by drilling from the rear surface of the electrode and sealing or plugging the end of the opening with a screw 24. A passageway 25 is drilled from the lower surface of the electrode and connects with the passageway 23. A second passageway 26 is drilled in the lower portion of the electrode and connects with the tube 21. Passageways 25 and 26 are counterbored and receive and hold a conduit 27 which encircles tip 28 in much the same manner as in the other embodiment. The tip 28 is shown with a slightly curved working face 29 and the conduit 27 is closer to the working face 29 than in the other type electrode shown in Figures 1, 2, and 3. The conduit 27 is secured by use of soft solder as described above and operates upon the same principle, directing cooling fluid under pressure and positive circulation to the welding tip to absorb heat. The fluid is then discharged through the bore 20. A machine screw 30 is provided to hold tip 28 in position on the electrode body and in good heat and electric current conducting relationship with the body.

With the arrangement contemplated by my invention, the coolant is applied closely adjacent the working surface, where it is most needed. The cooling arrangement can be employed regardless of the angle of offset without weakening the holder which would result in undue deflection. This is evident from the embodiment shown in Figures 4 and 5 where the holder is offset 90° on the vertical axis of the holder. Actual use of the invention has established that welding speeds may be increased because of the efficient cooling effected at the working surface. Also, the frequency of tip dressings was materially reduced for undesirable overheating did not occur. The consistency of weld strength was improved because thermal equilibrium was established rapidly.

While I have described and illustrate a preferred embodiment of my invention, it will be understood my invention is not limited thereto since it may be otherwise embodied within the scope of the following claims.

I claim:

1. In a resistance type spot welding machine, the combination with an electrode holder of an offset tip electrode comprising an electrode body, a welding tip offset from the vertical axis of the electrode holder, said tip having a contact face for engagement with the metal to be welded, a conduit for the passage of cooling fluid, said conduit being received within an external groove in said tip closely adjacent the contact face thereof, and means for directing cooling fluid into said electrode holder and into and through said conduit.

2. In a resistance type spot welding machine, the combination with an electrode holder of an offset tip electrode comprising an electrode body, a welding tip offset from the vertical axis of the electrode holder, said tip having a contact face for engagement with the metal to be welded, a passageway and a conduit within the electrode body, means associated with said welding tip in good heat transfer relationship therewith joining said passageway and conduit for the positive circulation of cool fluid to conduct heat away from the contact face of said welding tip.

3. In a resistance type spot welding electrode, the combination with an electrode holder of an offset tip electrode received within said holder, said electrode having a bore therein, a conduit received within said bore and spaced from the wall thereof to provide a passageway for the transfer of cooling fluid, a welding tip secured to said electrode, a tube extending about a substantial portion of the periphery of said tip adjacent the contact face thereof and in good heat transfer relationship therewith, one end of said tube being connected to said conduit and the other end being in communication with said passageway, and means for circulating cooling fluid through said conduit, tube, and passageway to conduct heat away from the working surface of said welding tip.

4. In a resistance type spot welding electrode, the combination with an electrode holder of an offset tip electrode received within said holder, said electrode having an axially extending bore therein, a tube received within said bore and spaced from the wall thereof to provide a passageway for the transfer of cooling fluid, sealing means disposed within said bore to receive the end of said tube and seal the same against passage of fluid from said tube to said passageway, a welding tip secured to said electrode, a conduit received within a recess provided in said tip about a substantial portion of the periphery thereof, and fluid conducting means connecting said tube with one end of said conduit and the other end of said conduit with said passageway for the positive circulation of cooling fluid through said conduit.

5. A fluid cooled offset tip electrode for resistance type welding machines comprising an electrode body having a portion offset from the vertical axis of the body, a welding tip having a working surface, a tube received within a bore in said electrode body and spaced from the wall thereof to provide a passageway therebetween, means for sealing one end of said tube against direct communication with said passageway, a heat conducting metal conduit secured in good heat conducting relationship with said welding tip in heat transfer relationship with the working face of the tip, one end of said conduit being connected with said tube and the other end with said passageway to provide for the circulation of cooling fluid through said conduit.

6. A fluid cooled offset tip electrode for resistance type spot welding machines, comprising an electrode body having a portion for reception in an electrode holder, a welding tip removably secured to said body and offset from the vertical axis of said portion for reception in the electrode holder, said tip having a working surface for engagement with the metal to be welded, a passageway and a conduit within the electrode body, means associated with said welding tip in good heat transfer relationship therewith joining said passageway and conduit for the positive circulation of cooling fluid to conduct heat away from the working surface of said welding tip.

7. A fluid cooled offset tip electrode for resistance type spot welding machines comprising an electrode body having a tip portion of the body offset from the vertical axis thereof, a welding tip secured to the offset portion of said body and having a welding surface thereon, a bore within said body substantially along the vertical axis thereof, through which cooling fluid may be discharged, a tube within said bore for connection with a source of cooling fluid, a conduit extending exteriorly of said body and encircling a substantial portion of the tip adjacent the welding surface thereof in good heat conducting relationship therewith, a connection between one end of said conduit and said tube, and a connection between the other end of said conduit and said bore.

JOHN J. WISLER.